US012709881B2

(12) United States Patent
Fazio

(10) Patent No.: US 12,709,881 B2
(45) Date of Patent: Aug. 18, 2026

(54) SYSTEMS AND METHODS FOR DIVERTING WATER FROM A SHOWER HEAD AND DISTRIBUTING WITHIN A BATHTUB OR SHOWER BASIN

(71) Applicant: Testarossa Incorporated, Homer Glen, IL (US)

(72) Inventor: Stefano C. Fazio, Lemont, IL (US)

(73) Assignee: Testarossa Incorporated, Mokena, IL (US)

( * ) Notice: Subject to any disclaimer, the term of this patent is extended or adjusted under 35 U.S.C. 154(b) by 130 days.

(21) Appl. No.: 18/908,724

(22) Filed: Oct. 7, 2024

(65) Prior Publication Data

US 2025/0027303 A1 Jan. 23, 2025

Related U.S. Application Data

(62) Division of application No. 18/205,852, filed on Jun. 5, 2023, now Pat. No. 12,139,897.

(51) Int. Cl.

| | |
|---|---|
| ***E03C 1/04*** | (2006.01) |
| ***A47K 3/034*** | (2006.01) |
| ***B05B 1/18*** | (2006.01) |
| ***E03C 1/02*** | (2006.01) |

(52) U.S. Cl.

CPC ............ *E03C 1/0408* (2013.01); *A47K 3/034* (2013.01); *E03C 1/025* (2013.01); *B05B 1/185* (2013.01)

(58) Field of Classification Search

CPC .......... E03C 1/0408; E03C 1/025; E03C 1/06; B05B 1/185; A47K 3/034

USPC ... 4/559, 567–570, 580–583, 605, 606, 601, 4/604, 615, 618

See application file for complete search history.

(56) References Cited

U.S. PATENT DOCUMENTS

| | | | | |
|---|---|---|---|---|
| 1,354,838 A | | 10/1920 | Perkins | |
| 1,714,694 A | | 5/1929 | Riley | |
| 2,171,023 A | | 8/1939 | Buxton | |
| 3,292,185 A | * | 12/1966 | Lucian | E03C 1/0408 4/615 |
| 4,951,329 A | | 8/1990 | Shaw | |
| 5,337,956 A | | 8/1994 | Crutcher | |
| 5,551,101 A | * | 9/1996 | Leach | A47K 3/002 4/580 |
| 6,164,570 A | | 12/2000 | Smeltzer | |
| 6,381,770 B1 | | 5/2002 | Raisch | |
| 6,782,567 B1 | | 8/2004 | Austin | |
| 8,276,615 B2 | | 10/2012 | Weber | |

(Continued)

*Primary Examiner* — Tuan N Nguyen

(74) *Attorney, Agent, or Firm* — Kaspar Law Company, LLC; Scott R. Kaspar

(57) ABSTRACT

Systems and methods are disclosed for diverting water from a shower diverter valve and distributing within an interior of a bathtub. One system includes a flexible hose having a first end connected to the shower diverter valve, the flexible hose extending into the interior of the bathtub and having a second end opposite the first, the second end of the hose connecting to an inlet of a basin disposed within the interior of the bathtub and supported by a bottom surface of the bathtub; the basin being generally rectangular in shape, the basin having an internal cavity for receiving water from the flexible hose, the basin having a top surface for placing a child during a bath, the top surface having a plurality of holes about an outer perimeter of the top surface of the basin.

3 Claims, 7 Drawing Sheets

(56) References Cited

U.S. PATENT DOCUMENTS

| | | | | |
|---|---|---|---|---|
| 10,278,544 | B1 * | 5/2019 | Kiddell | E03C 1/0408 |
| 2006/0242758 | A1 * | 11/2006 | Hall | E03C 1/0408<br>4/601 |
| 2007/0175531 | A1 | 8/2007 | Daniels | |
| 2007/0277891 | A1 | 12/2007 | Frankel | |
| 2010/0199420 | A1 * | 8/2010 | Lee | A47K 3/285<br>4/601 |
| 2013/0326804 | A1 | 12/2013 | Autry | |
| 2018/0127958 | A1 | 5/2018 | Zhong | |

* cited by examiner

SYSTEMS AND METHODS FOR DIVERTING WATER FROM A SHOWER HEAD AND DISTRIBUTING WITHIN A BATHTUB OR SHOWER BASIN

CROSS-REFERENCE TO RELATED APPLICATIONS

The present application is a divisional of, and claims priority to, U.S. patent application Ser. No. 18/205,852, filed Jun. 5, 2023, which is incorporated by reference herein in its entirety.

TECHNICAL FIELD

The present invention relates to shower diverter valves generally, and more particularly to systems and methods for diverting water from a shower diverter valve and distributing within the interior of a bathtub or a shower basin.

BACKGROUND

Conventional shower heads typically protrude from a wall above and at the front of a bathtub or similar shower basin. To accommodate attachments, shower heads sometimes utilize a diverter valve located along the stem of a shower head. The diverter valve, when turned or otherwise activated, forces water to travel through an outlet along the shower head stem, thereby bypassing the shower head.

Conventional shower head diverter valves have been used to connect, for instance, flexible metal plumbing hoses that connect to, for instance, a handheld shower head. Handheld shower heads allow for a person taking a shower to direct the flow of water to specific areas, or to prevent the flow of water to other areas, such as if a person is wearing a leg cast and desires to keep water away from the cast.

One disadvantage of conventional handheld shower heads is that they require a person to hold the shower head with one hand, thereby only allowing one hand to be free to facilitate the showering process. In the instance of a disabled or injured person, or in the instance of an elderly person with limited range of motion, holding onto a handheld shower held may be difficult and not be practicable.

Another disadvantage of conventional handheld shower heads is that they are less desirable to be used by children, such as infants, under the supervision of a parent assisting with the bathing process. Oftentimes the force and spray of water emitting from a handheld shower head is too significant a force for a child, making the showering experience uncomfortable, loud, and sometimes even painful for a child.

There presently is no shower diversion device that distributes and directs water from a conventional shower diverter valve of a shower head into an interior of a bathtub or shower basin in a manner to promote a safe, quiet, and enjoyable showering experience for children as well as those who may be elderly, injured or physically disabled.

SUMMARY OF THE INVENTION

According to one non-limiting aspect of the present disclosure, a system for diverting water from a shower diverter valve and distributing within an interior of a bathtub is disclosed. The system includes a flexible hose having a first end connected to the shower diverter valve, the flexible hose extending into the interior of the bathtub and having a second end opposite the first, the second end of the hose connecting to an inlet of a basin disposed within the interior of the bathtub and supported by a bottom surface of the bathtub; the basin being generally rectangular in shape, the basin having an internal cavity for receiving water from the flexible hose, the basin having a top surface for placing a child during a bath, the top surface having a plurality of holes about an outer perimeter of the top surface of the basin; wherein water flowing from the shower diverter valve through the flexible hose and into the internal cavity of the basin emits from the plurality of holes in the top surface of the basin, creating a gentle shower for bathing the child.

According to another non-limiting aspect of the present disclosure, a system for diverting water from a shower diverter valve and distributing within an interior of a bathtub is disclosed. The system includes a flexible hose having a first end connected to the shower diverter valve, the flexible hose extending into the interior of the bathtub and having a second end opposite the first, the second end of the hose connecting to an inlet of a mat disposed within the interior of the bathtub and supported by a bottom surface of the bathtub; the mat being generally rectangular in shape, the mat having an internal cavity for receiving water from the flexible hose, the mat having a top surface for placing a child during a bath, the top surface having a plurality of outlet valves about an outer perimeter of the top surface of the basin; wherein water flowing from the shower diverter valve through the flexible hose and into the internal cavity of the mat emits from the plurality of outlet valves in the top surface of the mat, creating a gentle shower for bathing the child.

According to yet another non-limiting aspect of the present disclosure, a system for diverting water from a shower diverter valve and distributing within an interior of a bathtub is disclosed. The system includes a flexible hose having a first end connected to the shower diverter valve, the flexible hose extending into the interior of the bathtub and having a second end opposite the first, the second end of the hose connecting to an inlet of a table disposed on an upper edge of the bathtub and straddling the width of the bathtub; the table having an internal cavity for receiving water from the flexible hose, the table having a top surface with a plurality of external outlets, the plurality of external outlets configured to emit water therefrom, the plurality of external outlets having at least one control valve configured to control the emission of water from the plurality of external outlets; wherein the at least one control valve is configured to move from a closed position to an open position, the emission of water from the plurality of external outlets stopping when the at least one control valve is in the closed position.

According to still yet another non-limiting aspect of the present disclosure, a system for diverting water from a shower diverter valve projecting from a shower wall and distributing onto a person positioned below the shower diverter valve is disclosed. The system includes a tubular body member connected to the shower diverter valve, the tubular body member secured to the shower wall, the tubular body member having an outlet wherein water from the shower diverter valve entering the tubular body member passes through the tubular body member and emits from the outlet; a flexible memory hose having a first end connected to the outlet of the tubular body member, the flexible memory hose extending downwardly proximate the person and having a second end opposite the first, the second end of the flexible memory hose connecting to a hoop; the hoop having a hollow interior for receiving water from the flexible memory hose, the hoop further having a plurality of holes on a bottom side of the hoop about a perimeter of the hoop;

wherein the hoop is positioned above or around a person for showering, with water from the shower diverter valve traveling through the tubular body member and through the flexible memory hose and into the hoop, the water emitting from the plurality of holes on the bottom side of the hoop to create an evenly dispersed shower around the person.

Additional features and advantages are described herein, and will be apparent from the following Detailed Description and the figures.

BRIEF DESCRIPTION OF THE DRAWINGS

Features and advantages of the system and method described herein may be better understood by reference to the accompanying drawings in which.

A skilled artisan will appreciate the foregoing details, as well as others, upon considering the following Detailed Description of certain non-limiting embodiments of the bathtub spout extension system according to the present disclosure. One of ordinary skill also may comprehend certain of such additional details upon using the system described herein.

DETAILED DESCRIPTION

The present invention is directed to shower diverter valves generally, and more particularly to systems and methods for diverting water from a shower diverter valve and distributing within the interior of a bathtub or a shower basin.

Figure 1:
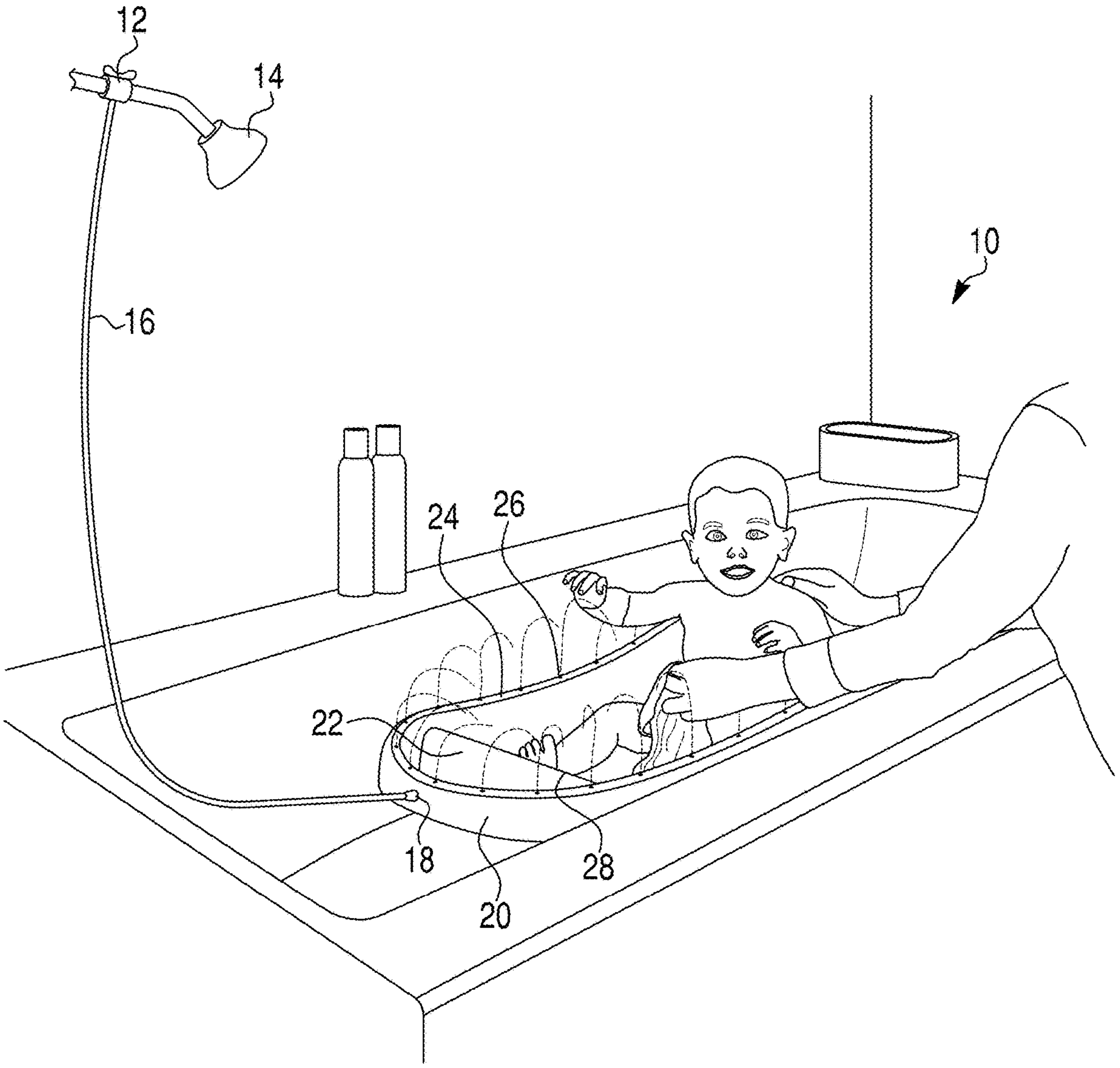
FIG. 1 depicts a perspective view of an embodiment of a shower diversion device of the present disclosure.

As shown in FIG. 1, an embodiment is shown of a diverter device 10 that is configured to connect with a standard diverter valve 12 of a typical shower head 14. The diverter device includes a flexible plumbing hose 16 that connects on a first end with the diverter valve 12 and connects with an inlet valve 18 on a second end of hose 16 opposite the first end. The inlet valve 18 connects the flexible hose 16 to a basin 20.

Basin 20 is configured for seating an infant or young child, to help that child take a shower-like experience to become more accustomed to showering, both in terms of the sound and the water spray associated with showering. Basin 20 includes a front portion 22 and sides 24. Side portion 24 has a plurality of holes 26 to form a spray pattern, and similarly, front portion 22 has a plurality of holes 28 to form a spray pattern. The holes 26, 28 form a fountain surrounding the child while sitting within the basin 20 that gently strike the child to aid with cleansing while also providing a fun "splash pad"-like environment.

Figure 2:
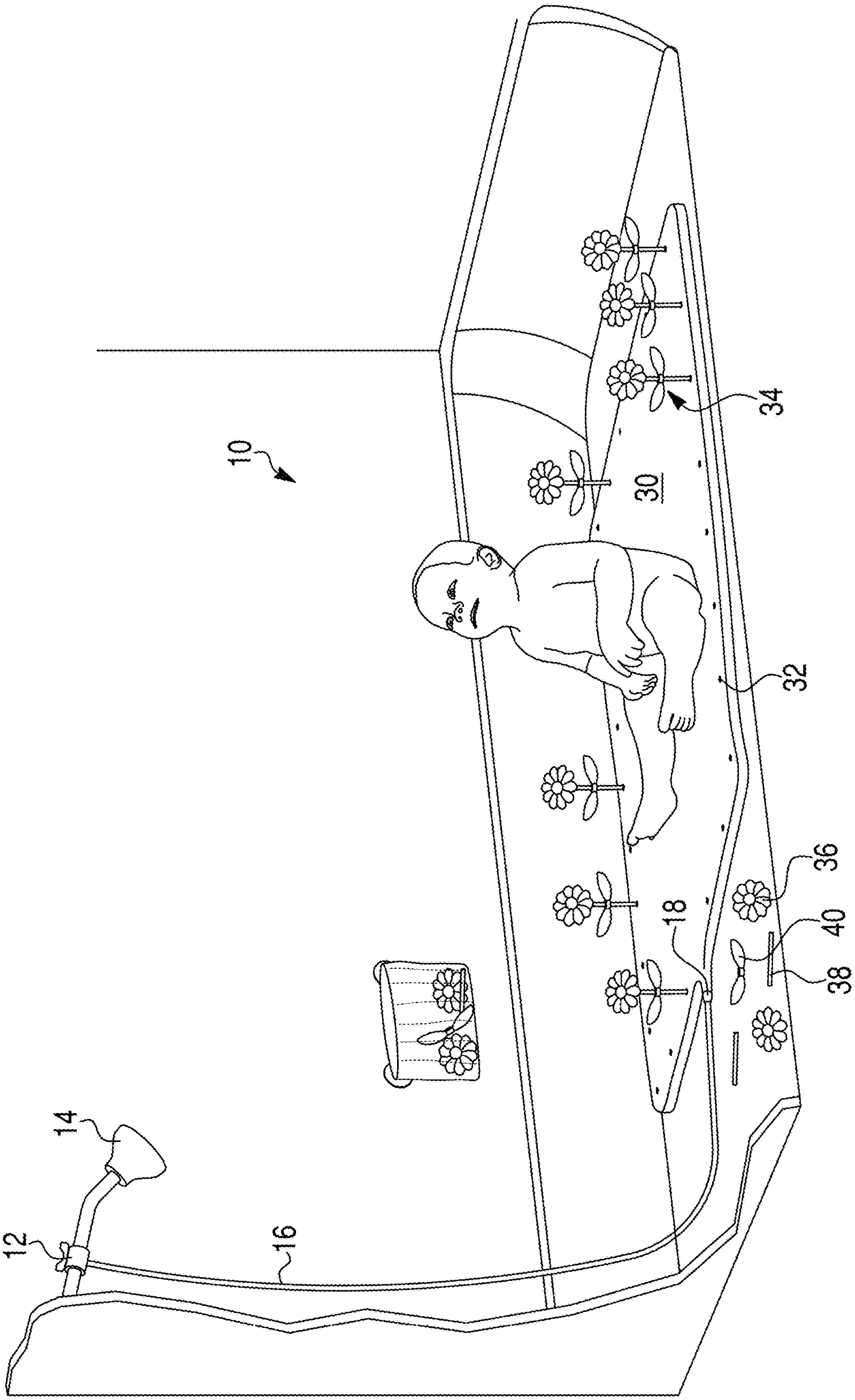
FIG. 2 depicts a perspective view of another embodiment of a shower diversion device of the present disclosure.

As shown in FIG. 2, the diverter device 10, connecting with the diverter valve 12 of the shower head 14 connects via hose 16 and inlet valve 18 to an inflatable mat 30. Mat 30 preferably is made of a silicone or similarly resilient material, and partially inflates under the flow of water entering an interior cavity of the mat 30 via inlet valve 18. Mat 30 includes a plurality of outlet valves 32 circumnavigating an outer perimeter of mat 30 that provide as a relief for the internal water pressure, allowing water inside the mat 30 to spray outwardly into the bathtub, or a shower basin surface, to create a gentle shower to aid with cleansing a child while also providing a fun "splash garden" or "splash pad"-like environment.

Outlet valves 32 are configured to receive plastic inserts 34 to direct or redirect the flow of water emitting from outlet valves 32. In one embodiment, the plastic inserts 34 resemble flowers that a child can plug into an outlet valve 32 to direct the flow of water internally through and out the top of the plastic inserts 34, or alternatively, can plug the flow of water out of the outlet valve 32, thereby increasing water pressure and flow out of adjacent outlet valves 32. Plastic insert 34 may include interchangeable and connectable components 36, 38, 40, to allow a child to build or customize plastic insert 34. As shown specifically in FIG. 2, plastic insert 34 includes a flower petal 36, a stem 38, and a leaf cluster 40, such that a child may build a custom flower for inserting into outlet valve 32. The components 36, 38, 40 may be maintained or stored in a bag or netting attachable to a bathtub wall with suction cups, as one example.

Figure 3:
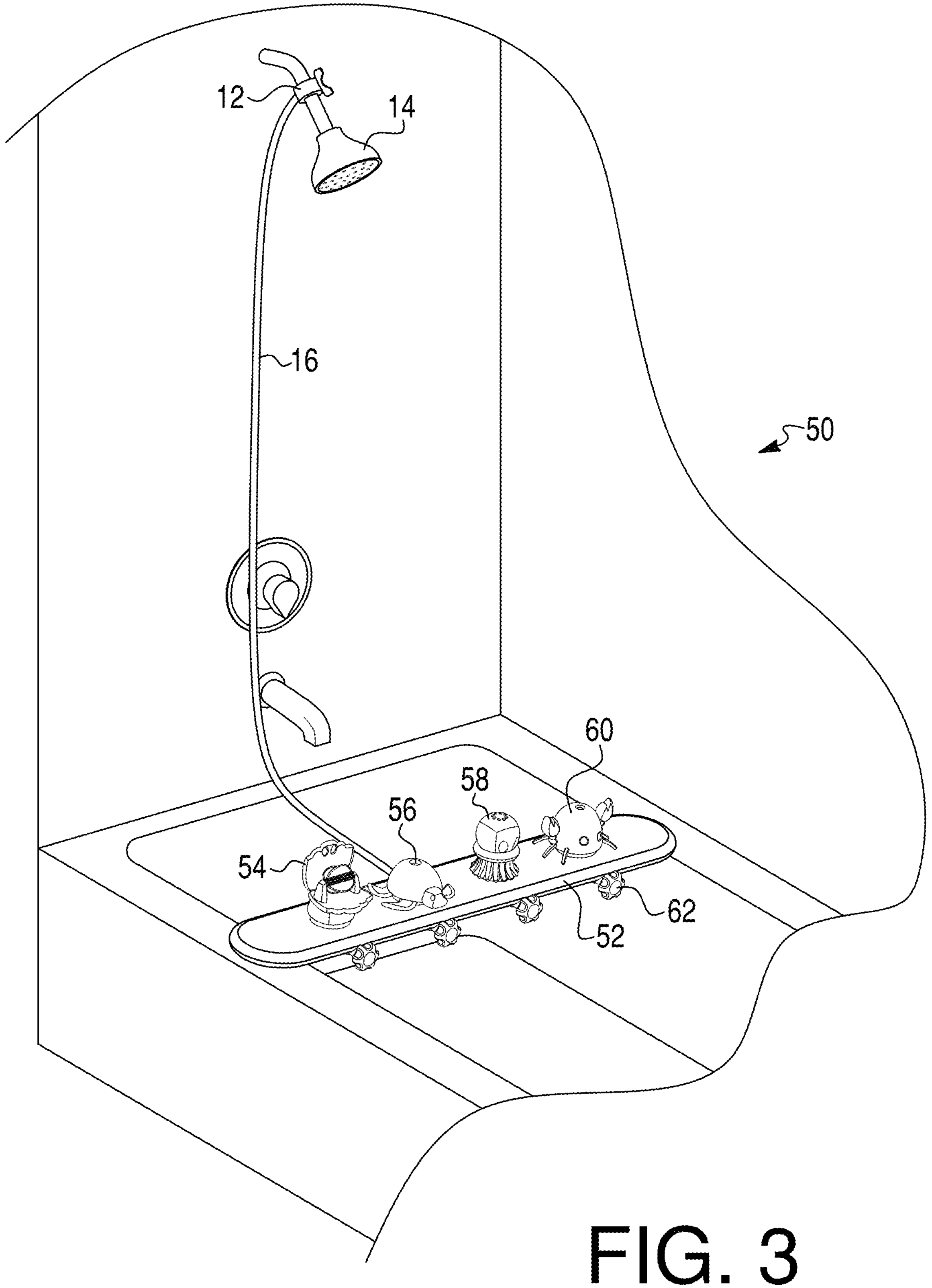
FIG. 3 depicts a perspective view of yet another embodiment of a shower diversion device of the present disclosure.

As shown in FIG. 3, diverter device 50 connects with diverter valve 12 of shower head 14 via flexible plumbing hose 16. Hose 16 connects to a table 52 via an inlet valve (not shown). Table 52 is configured to span the width of a conventional bathtub, being supported on its ends by the sides or edges of the bathtub. Table 52 is made of a plastic or polymer material, and may be injection molded to be of unibody construction. Table 52 includes an internal channel to direct the flow of water from hose 18 to external outlets 54, 56, 58, and 60, which emit the outpouring water in one of a plurality of spray patterns when one or more of control valves 62 are dialed to an open position. Table 52 secures to the edges or sides of the bathtub by use of one or more suction cups at each end disposed underneath the table 52.

Figure 4:
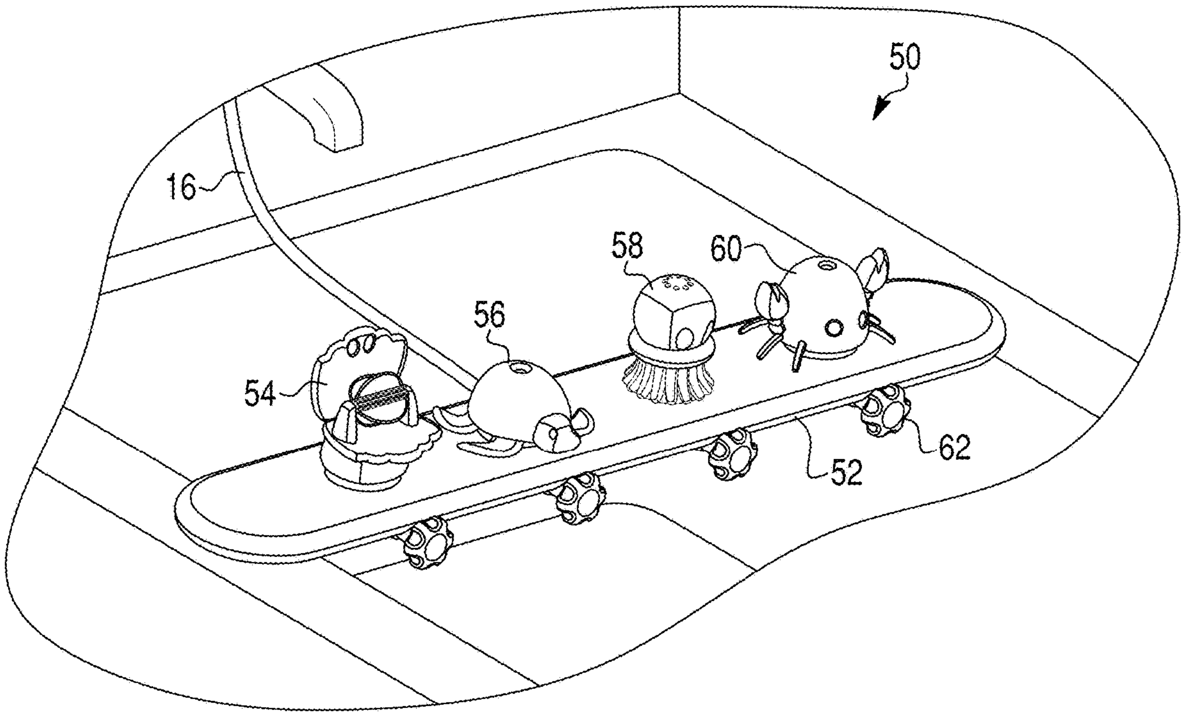
FIG. 4 depicts a close-up front view of the embodiment of the shower diversion device of the present disclosure shown in FIG. 3.

External outlets 54, 56, 58, and 60 may take the shape of one of more characters, to create a more playful experience for children interacting with the table 52. For instance, in one embodiment, as shown in FIG. 4, the external outlets 54, 56, 58, and 60 may take the form of one or more sea creatures, such as the clam, turtle, octopus, and crab shown as examples in FIG. 4. External outlets 54, 56, 58, and 60 may be removable and interchangeable with other characters.

When a child dials one of the control valves 62 from a closed position to an open position, water traveling internally through table 52 from hose 18 is permitted to flow out of the external outlet proximate the adjusted control knob. A different spray pattern may be achieved with each of the different external outlets 54, 56, 58, and 60. For example, water may emit from the external outlet in a blast spray pattern, as shown in FIG. 4 with respect to external outlet 54, or in a gentle shower spray pattern, as shown with respect to external outlet 58, for example.

Figure 5:
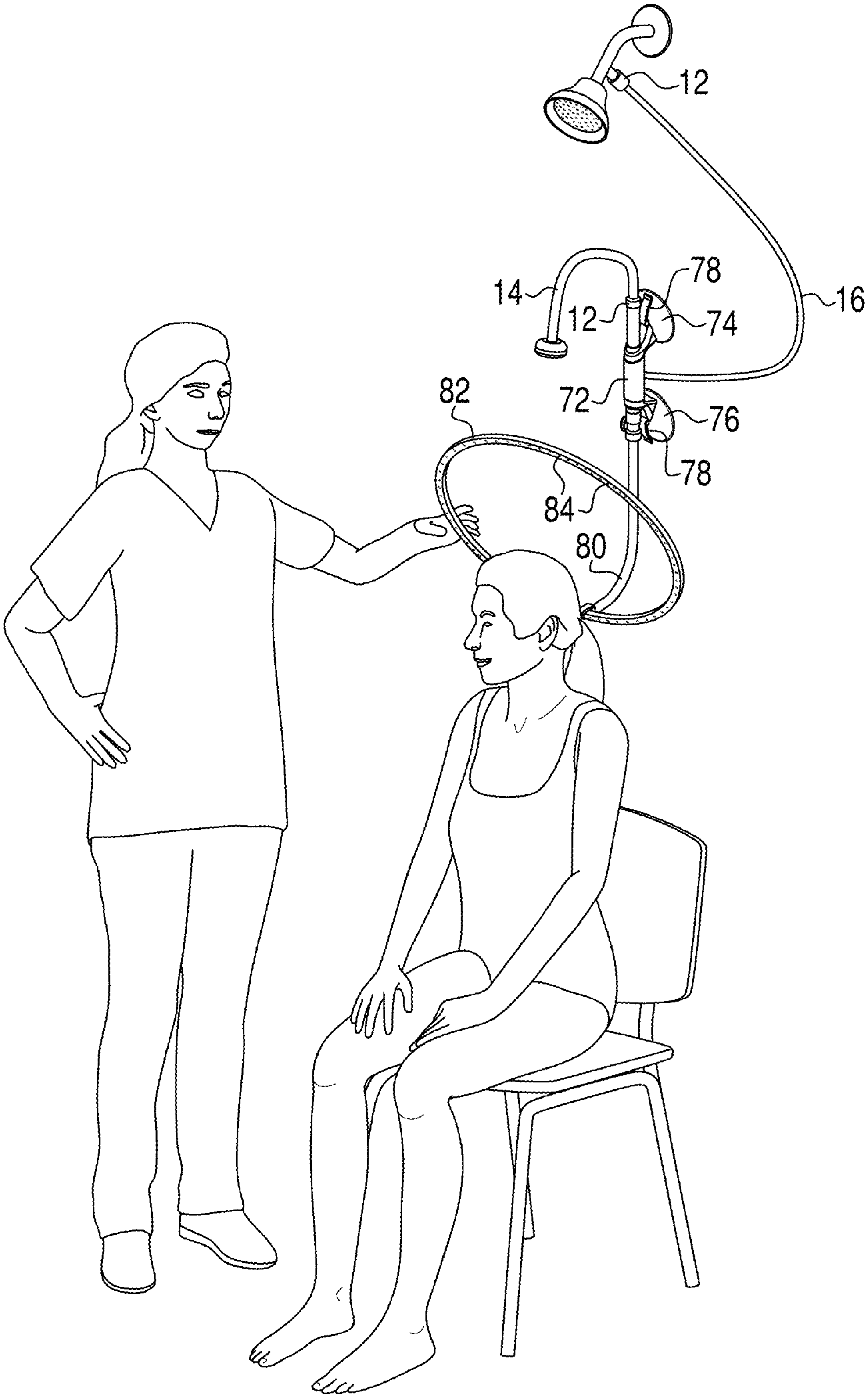
FIG. 5 depicts a perspective view of still yet another embodiment of a shower diversion device of the present disclosure.
Figure 6:
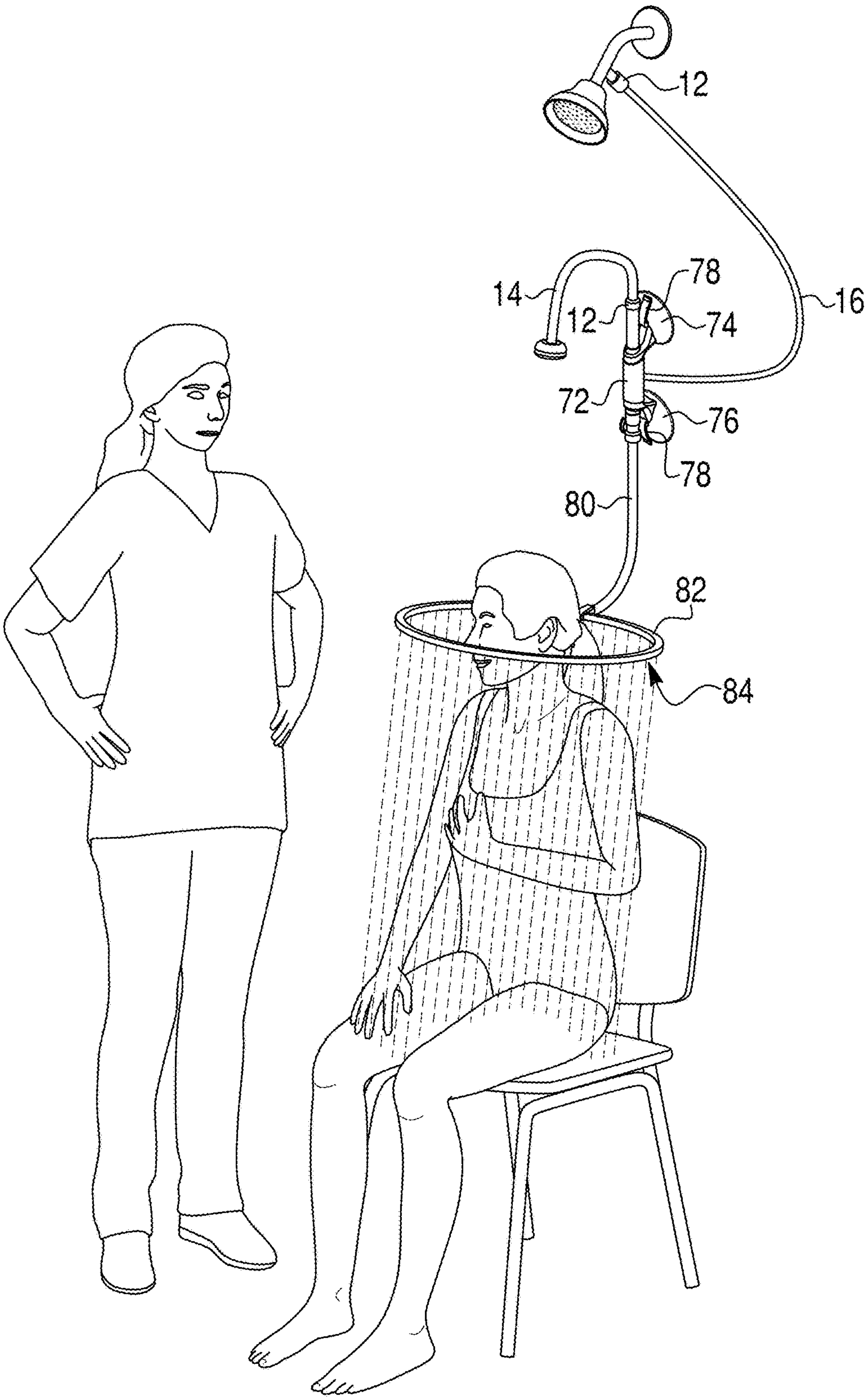
FIG. 6 depicts a second perspective view of the embodiment of the shower diversion device of the present disclosure shown in FIG. 5.
Figure 7:
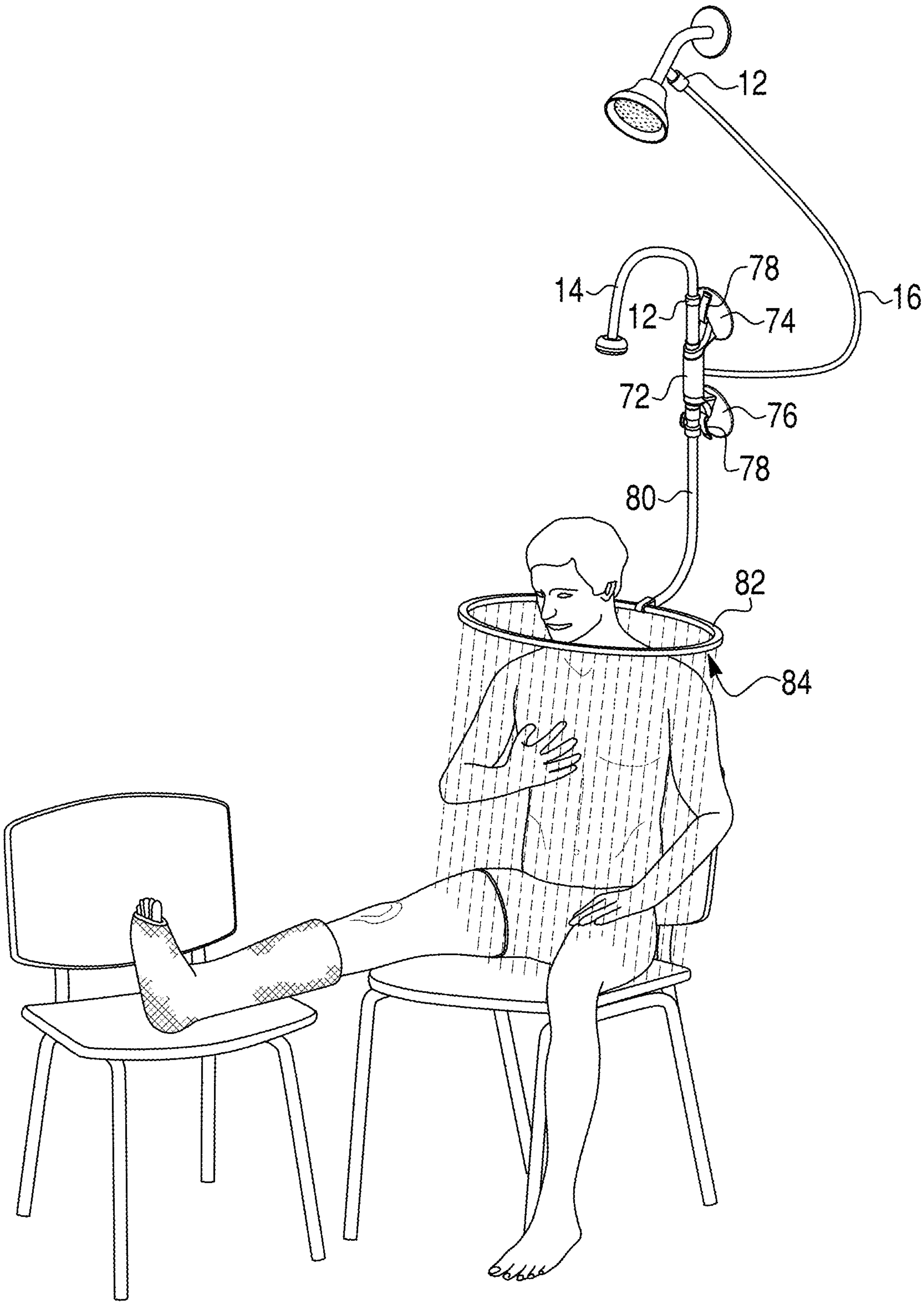
FIG. 7 depicts a third perspective view of the embodiment of the shower diversion device of the present disclosure shown in FIG. 5.

As shown in FIGS. 5-7, diverter device 70 connects with diverter valve 12 of shower head 14. Diverter device 70 has a tubular body member 72 that may connect directly to diverter valve 12. Alternatively, tubular body member 72 may connect to diverter valve 12 via flexible hose 18.

Tubular body member 72 attaches to the wall from which the shower head 14 emerges via a pair of suction cups 74, 76, which can be activated by a depressing a lever 78 on each suction cup. Tubular body member 72 both supports diverter device 70 and attaches the device to the wall, but tubular body member 72 also fluidly connects diverter valve 12 with a flexible outlet hose 80 to directly water down and through outlet hose 80. Outlet hose 80 is preferably a memory metal hose that bends and retains its shape, the benefit of which is shown in FIGS. 5-7.

A circular shower ring, hoop, or "halo" 82 connects to flexible outlet hose 80. Halo 82 has a plurality of holes or outlets located about the diameter on a bottom side of the halo 82. As such, water flowing through tubular body member 72 flows downwardly through outlet hose 80 and within halo 82, emitting through holes or outlets 84 in a gentle rain shower spray pattern.

As shown in FIG. 5, the halo 82 can be raised to an upward position to allow for a person bathing with the diverter device 70 to enter or exit the halo 82. As shown in FIG. 5, a person may be seated on a chair, with the halo 82 raised upwardly to allow the person to be seated. The halo 82 is lifted to an upward position and remains in that position until lowered. The flexible outlet hose 80 retains memory of the position it is placed into, such that when the halo 82 is raised upwardly, outlet hose 80 bends slightly to allow halo 82 to remain in the upward position.

As shown in FIG. 6, once the person using diverter device 70 has been seated, halo 82 is lowered to a horizontal position parallel with the floor, which is the appropriate position for the halo 82 during use. As shown in FIG. 6, the holes or outlets 84 on halo 82 emit a rain shower spray pattern completely around the person There are many advantages and benefits for diverter device 70. FIGS. 5-6 show the diverter device 70 being used with, for instance, an elderly person, who may need to sit on a chair while taking a shower so as not to slip. Conventional shower heads only spray in one direction, which means that a seated person would not be able to easily wash his or her entire body while seated in front of a conventional shower head. The use of the halo 82 provides for washing of the entire body, as the shower spray pattern surrounds a person using the diverter device 70.

As another example, as shown in FIG. 7, an injured person, such as a person having a leg cast, may benefit from the use of diverter device 70, as the shower spray emitting from halo 82 cascades down around the patient's body, but casted appendages may be placed outside the reach of the shower spray.

What is claimed is:

1. A system for diverting water from a shower diverter valve and distributing within an interior of a bathtub, the system comprising:

a flexible hose having a first end connected to the shower diverter valve, the flexible hose extending into the interior of the bathtub and having a second end opposite the first, the second end of the hose connecting to an inlet of a mat disposed within the interior of the bathtub and supported by a bottom surface of the bathtub;

the mat being generally rectangular in shape, the mat having an internal cavity for receiving water from the flexible hose, the mat having a top surface for placing a child during a bath, the top surface having a plurality of outlet valves about an outer perimeter of the top surface of the mat;

an insert for placement within the plurality of outlet valves, the insert configured to control the flow of water emitting from the plurality of outlet valves;

wherein the insert is comprised of more than one component, each component being configured to connect with one another, each component being interchangeable with one another; and;

wherein water flowing from the shower diverter valve through the flexible hose and into the internal cavity of the mat emits from the plurality of outlet valves in the top surface of the mat, creating a gentle shower for bathing the child.

2. The system of claim 1 wherein the insert is shaped to resemble a flower.

3. The system of claim 2 wherein the insert is comprised of more than one component, each component resembling a flower part, each component being configured to connect with one another.

* * * * *